United States Patent [19]
Decker et al.

[11] Patent Number: 5,962,568
[45] Date of Patent: Oct. 5, 1999

[54] COATING POWDER FOR HIGH TEMPERATURE RESISTANT COATINGS

[75] Inventors: Owen H. Decker, Wyomissing; Charles P. Tarnoski, Sinking Spring, both of Pa.

[73] Assignee: Morton International, Inc., Chicago, Ill.

[21] Appl. No.: 09/052,664

[22] Filed: Mar. 31, 1998

[51] Int. Cl.⁶ .................................................. C08K 3/08
[52] U.S. Cl. .................... 524/440; 524/443; 524/449; 524/492; 524/588; 528/10; 528/43; 528/19
[58] Field of Search ..................... 528/10, 43, 19; 524/443, 449, 588, 492, 440

[56] References Cited

U.S. PATENT DOCUMENTS

| | | | |
|---|---|---|---|
| 4,877,837 | 10/1989 | Reising et al. | 525/100 |
| 5,319,040 | 6/1994 | Wengrovius et al. | 525/478 |
| 5,324,806 | 6/1994 | Wengrovius et al. | 528/10 |
| 5,422,396 | 6/1995 | Daly et al. | 525/106 |
| 5,684,066 | 11/1997 | Eklund et al. | 523/435 |

*Primary Examiner*—Melvyn I. Marquis
*Attorney, Agent, or Firm*—Wayne E. Nacker; Gerald K. White

[57] ABSTRACT

A silicone resin for forming a coating powder has organic substitutents selected from the group consisting of phenyl, methyl, $C_2$ through $C_6$ alkyl and mixtures thereof; a viscosity of between about 500 and about 10,000 cps at 150° C.; a condensable hydroxyl content of between about 2.0 and about 4.5 wt %; a glass transition temperature of about 55° C. or above; and about 0.2% or less of organic solvent.

13 Claims, No Drawings

COATING POWDER FOR HIGH TEMPERATURE RESISTANT COATINGS

The present invention is directed to coating powder for producing coatings that are resistant to high temperatures, particularly to silicone-based coating powders.

BACKGROUND OF THE INVENTION

A number of commercially available polysiloxane resins are used in powder coatings. In a typical formulation they are combined with at least one organic resin, and usually with an organic curing agent as well. Examples of these coatings are the silicone/GMA-acrylic blends of Reisling (U.S. Pat. No. 4,877,837) and Eklund (U.S. Pat. No. 5,684,066) and the silicone/acid-functional acrylic/triglycidyl isocyanurate compositions of Daly et al. (U.S. Pat. No. 5,422,396).

Another desirable category of coatings could be called 100% silicone coatings. These coatings contain no non-silicone resins or non-silicone stoichiometric curing agents. Cure in these coatings is effected by catalysts which accelerate the condensation of siloxyl (SiOH) end groups of silicone resins as in Scheme 1.

Scheme 1

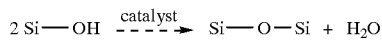

Coatings that are 100% silicone are desirable, for example, because they have superior color stability at high temperature. This is especially useful in white and light colored coatings.

Such coatings have appeared in patents. For example, Daly et al. in U.S. Pat. No. 5,422,396 discloses in a "comparative example" a 100% silicone coating based on Dow Corning 6-2230 silicone resin. Beginning in 1994 and 1995, Morton International, Inc. sold 100% silicone coating powders based on Dow Corning 6-2230. However, these were commercially unsuccessful and less than 1000 pounds were sold. Significant deficiencies including severe blocking of the powder, i.e., the tendency of the powder to clump together, and foaming during curing. Hence, it is a primary object of the present invention to provide a 100% (of the binder resin) silicone coating powder which neither blocks significantly nor foams and which forms a smooth, continuous coating.

SUMMARY OF THE INVENTION

In accordance with the invention there is provided a coating powder in which the binder is 100% silicone or substantially so. The silicone resin of the coating powder has organic substitutents selected from the group consisting of phenyl, methyl, $C_2$ through $C_6$ alkyl and mixtures thereof. The silicone resin has a viscosity of between about 500 and about 10,000 cps at 150° C., preferably 2000 to 5000 cps. The silicone resin has a condensable hydroxyl content of between about 2 and about 4.5 wt %, preferably from about 2 to about 3 wt. %. The silicone resin has a glass transition temperature ($T_g$) of about 55° C. or above, preferably about 60° C. or above. The silicone resin contains about 0.2% or less of organic solvents, preferably about 0.1% or less.

DETAILED DESCRIPTION OF CERTAIN PREFERRED EMBODIMENTS

Herein, unless otherwise noted, all percentages are by weight. The binder resin, i.e., the silicone, is expressed as 100 wt %; other components of coating powders such as fillers, pigments, flow control agents, cure catalysts, etc are expressed as parts per hundred parts resin (phr) by weight.

Coating powders in accordance with the invention have a unique set of physical parameters which are believed to be novel and which are not believed to be found in any currently available commercial silicone resin. The recited set of parameters are found to be necessary for formulating a coating powder that forms an excellent high temperature resistant coating.

The above-recited viscosity parameters are required for appropriate melt-flow of the molten coating powder at the temperatures whereat the coating powder is fused and cured.

The lower limits of $T_g$ recited above are necessary to prevent undue blocking of the coating powder. The tendency of a powder coating to sinter or block is an important measure of its commercial value. Minor blocking is normal for coating powders. A tendency to excessively block can make cold storage, shipping, and handling necessary. Badly blocked powder is useless and must be discarded. Blocking is measured by weighing a 1" diameter cylinder of powder 1 inch (2.54 cm) deep with 110 grams at 110° F. (43° C.) for 24 hours and evaluating the difficulty of breaking the sample back into usable powder.

A smooth textured appearance is desirable for high temperature coatings. Bubbles caused by outgassing of water and organic solvent mar the appearance of a coating. Very rough films are usually not continuous, nullifying their usefulness as protective barriers.

The condensable hydroxyl content must not be too high. Otherwise, too much water outgasses during curing of the coating powder, resulting in a foamy appearance of the coating.

On the other hand, the lower end of the condensable hydroxyl content range is important because below this the coating powder will not cure or will cure too slowly to be suitable for commercial applications. The gel time of a coating powder is a measure of how fast crosslinking reactions occur, usually measured on a horizontal plate at 400° F. (204° C.). Powders which take longer than 300 seconds to gel are generally not considered reactive enough to be commercially useful.

Most commercial silicone resins contain some residual organic solvent as a consequence of the process of silicone resin synthesis. Such organic solvent tends to be internally trapped within the silicone resin and is generally not removed when the silicone resin is melt blended with other components to form a coating powder composition. Herein, it is found that it is necessary to substantially remove such residual organic solvent. This is accomplished by melting the silicone resin and removing solvent from the molten resin, e.g., by sparging with a gas, such as nitrogen, or by vacuum.

Herein, a silicone resin in accordance with the invention was made by further polymerizing a commercial silicone resin, i.e., Dow Corning 6-2230. In a melt polymerization, residual solvents, absorbed water and water of condensation were removed by nitrogen sparging, yielding a resin with a glass transition temperature high enough to eliminate blocking problems. Fortunately, the resin also yields a desirable combination of low outgassing during cure, acceptable viscosity and fast cure speed when catalyzed properly.

A coating powder containing the resin may be filled or unfilled, clear of pigmented. In a filled coating powder, it is found desirable to employ at least 40 phr mica and/or calcium metasilicate. It may also be desirable to include at least about 10 phr zinc powder to impart corrosion resistance. While silicone resin self-condenses at elevated temperatures, it is often desirable to employ a cure catalyst, such as zinc acetylacetonate, so as to achieve rapid gel time. Typically at least about 0.1 phr of such a cure catalyst is employed, up to about 2.0 phr. Other common additives include flow aids, pigments, etc.

Coating powders of the present invention are produced in a normal manner. The components are mixed and the mixture melt blended at a temperature somewhat above the melting point of the silicone resin. The composition is then cooled and fragmented to produce powder. The powder is then sorted according to size, particles between about 10 and about 100 microns in greatest dimension being desirable.

The coating powder is applied to a substrate in a normal manner, e.g., by electrostatic spraying. Then the coating powder is heated for a sufficient amount of time to fuse and cure the coating powder. High temperature coatings are applied, for example, to barbecue grills, automotive mufflers, oven parts, and the like.

The invention will now be described in greater detail by way of specific examples.

EXAMPLE 1

Preparation of a Polysiloxane Polymer in Accordance with the Invention

To a stirred 50-liter glass kettle fitted with a nitrogen sparge and a still head was charged 45 kg of Dow Corning 6-2230 resin (melt viscosity 200 cP at 150° C.). The resin was melted and stirred at 165–175° C. until its viscosity reached 2500 cP, then discharged. The melt cooled to a clear, colorless, brittle resin with a viscosity of 2707 cP at 150° C. A total of 740 ml of distillate was collected, including 365 ml of water and 375 ml of organic solvents, mostly toluene. Analysis showed the resin to contain 2.3% hydroxyl groups. In contrast, a sample of Dow Corning 6-2230 resin contained 4.7% hydroxy groups. A differential scanning calorimeter (DSC) showed the sample to have a glass transition temperature of 63.6. Dow Corning 6-2230 resin was determined to have a glass transition temperature of approximately 50.2° C.

EXAMPLE 2

Preparation of Polysiloxane Polymer in Accordance with the Invention

To a stirred 2-liter glass kettle fitted with a nitrogen sparge and a still head was charged 2 kg of Dow Corning Z-6018 resin (melt viscosity 750 cP at 150° C.). The resin was melted and stirred at 180° C. until its viscosity reached 4600 cP, then discharged. The melt cooled to a clear, colorless, brittle resin with a viscosity of 4625 cP at 150° C. A total of 21.5 ml of distillate was collected.

Key characteristics of silicone resin parameters according to the invention and actual parameters of the silicone resins of Examples 1 and 2 are compiled in Table 1 below:

TABLE 1

Silicone Resins

| Resin | Organic Substituents | Viscosity (cP at 150° C.) | OH Content (Wt. %) | $T_g$ (° C.) | Solvent Content (Wt. %) |
|---|---|---|---|---|---|
| Invention | methyl, phenyl, $C_2$–$C_6$ alkyl | 500–10,000 (2000–5000)* | 2.0–4.5 (2–3)* | >55 (>60)* | <0.2 (<0.1)* |
| Example 1 | methyl, phenyl | 2707 | 2.3 | 63.9 | <0.1 |
| Example 2 | propyl, phenyl | 4625 | 4.0 | 66.2 | <0.1 |

*preferred results in parentheses

COATING EXAMPLES 3–9

(Examples 2 and 4 in Accordance with the Invention, Others Comparative)

The components listed in Table 2 below were compounded, chilled, chipped, ground and sieved through a 140 mesh screen in the usual manner to prepare a coating powder. This powder was electrostatically sprayed onto 0.032 inch-thick mild steel panels "Q" panels and cured in an oven at 450° F. for 15 minutes. The coating was evaluated by for the properties listed in Table 4. Especially important factors are the appearance of the coating, and the degree of blocking or sintering.

TABLE 2

Compositions and Test Results

| Component | Ex. 3 (parts) | Ex. 4 (parts) | Ex. 5 (parts) | Ex. 6 (parts) | Ex. 7 (parts) | Ex. 8 (parts) | Ex. 9 |
|---|---|---|---|---|---|---|---|
| 6-2230 Silicone Resin (Dow Corning) | 100 | | | | | | |
| Example 1 Silicone Resin | | 100 | | | | | |
| Z-6018 Silicone Resin (Dow Corning) | | | 100 | | | | |
| Example 2 Silicone Resin | | | | 100 | | | |
| H-44 Silicone Resin (Wacker) | | | | | 100 | | |
| SY-430 (Wacker) | | | | | | 100 | |
| REN-100 Silicone Resin (Wacker) | | | | | | | 100 |
| Zinc acetylacetonate | 0.5 | 0.5 | 0.5 | 0.5 | 0.5 | 0.5 | 0.5 |
| 325 HK Mica Filler (Suzorite Mica Products, Inc.) | 80 | 90 | 100 | 100 | 100 | 100 | 90 |
| Resiflow P-67 Acrylic Flow Aid (GCA Chemical Corporation) | 1.5 | 1.5 | 1.5 | 1.5 | 1.5 | 1.5 | 1.5 |
| Benzoin Degassing Aid | 0.8 | 0.8 | 0.8 | 0.8 | 0.8 | 0.8 | 0.8 |

TABLE 2-continued

| | Compositions and Test Results | | | | | | |
|---|---|---|---|---|---|---|---|
| Component | Ex. 3 (parts) | Ex. 4 (parts) | Ex. 5 (parts) | Ex. 6 (parts) | Ex. 7 (parts) | Ex. 8 (parts) | Ex. 9 |
| (Estron Chemical, Inc.) | | | | | | | |
| Shepherd Black #1 | 15 | 15 | 15 | 15 | 15 | 15 | 15 |
| Zinc Dust 64 | 25 | 40 | 50 | 50 | 50 | 50 | 40 |
| Blocking | Severe | Minor | Severe | Minor | Minor | Severe | Severe |
| Appearance | Foamy | Smooth Texture | Foamy | Smooth Texture | Rough | Rough | Smooth Texture |
| Gel Time | 300+ | 80 | 300+ | 93 | 300+ | 101 | 300+ |

What is claimed is:

1. A silicone resin having organic substitutents selected from the group consisting of phenyl, methyl, $C_2$ through $C_6$ alkyl and mixtures thereof; a viscosity of between about 500 and about 10,000 cps at 150° C.; a condensable hydroxyl content of between about 2.0 and about 4.5 wt %; a glass transition temperature of about 55° C. or above; and about 0.2% or less of organic solvent.

2. The silicone resin according to claim 1 having a viscosity at 150° C. of between about 2000 and about 5000 cps.

3. The silicone resin according to claim 1 having between about 2 and about 3 wt. % condensable hydroxyl content.

4. The silicone resin according to claim 1 having a glass transition temperature of about 60° C. or above.

5. The silicone resin according to claim 1 having about 0.1% or less organic solvent.

6. A coating powder composition comprising a binder resin which is about 100% silicone resin, said silicone resin having organic substitutents selected from the group consisting of phenyl, methyl, $C_2$ through $C_6$ alkyl and mixtures thereof; a viscosity of between about 500 and about 10,000 cps at 150° C.; a condensable hydroxyl content of between about 2.0 and about 4.5 wt %, a glass transition temperature of about 55° C. or above; and about 0.2% or less of organic solvent.

7. The composition according to claim 6 wherein said silicone resin has a viscosity at 150° C. of between about 2000 and about 5000 cps.

8. The composition according to claim 6 wherein said silicone resin has between about 2 and about 3 wt. % condensable hydroxyl content.

9. The composition according to claim 6 wherein said silicone resin has a glass transition temperature of about 60° C. or above.

10. The composition according to claim 6 wherein said silicone resin contains about 0.1% or less organic solvent.

11. The composition according to claim 6 containing about 40 phr or more of a filler selected from the group consisting of mica, calcium metasilicate and mixtures thereof.

12. The composition according to claim 6 containing about 10 phr or more of zinc powder.

13. The composition according to claim 6 containing about 0.1 phr of a silicone resin cure catalyst.

* * * * *